(12) United States Patent
Atkinson

(10) Patent No.: US 7,055,049 B2
(45) Date of Patent: *May 30, 2006

(54) PORTABLE COMPUTER WITH LOW-POWER AUDIO CD-PLAYER

(75) Inventor: Lee Atkinson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 629 days.

This patent is subject to a terminal disclaimer.

(21) Appl. No.: 10/134,937

(22) Filed: Apr. 29, 2002

(65) Prior Publication Data

US 2002/0120879 A1  Aug. 29, 2002

Related U.S. Application Data

(63) Continuation of application No. 09/801,386, filed on Mar. 8, 2001, now Pat. No. 6,385,734, which is a continuation of application No. 09/566,748, filed on May 9, 2000, now Pat. No. 6,378,077, which is a continuation of application No. 09/150,530, filed on Sep. 10, 1998, now Pat. No. 6,088,809, which is a continuation of application No. 08/699,989, filed on Aug. 20, 1996, now Pat. No. 5,838,983.

(60) Provisional application No. 60/019,109, filed on Jun. 3, 1996.

(51) Int. Cl.
G06F 1/26 (2006.01)

(52) U.S. Cl. ...................................... 713/324; 713/322

(58) Field of Classification Search ............... 709/200; 710/14, 17, 19; 713/310, 320, 324, 322
See application file for complete search history.

(56) References Cited

U.S. PATENT DOCUMENTS

| 5,511,205 | A | * | 4/1996 | Kannan et al. | ............. 713/324 |
| 5,648,799 | A | * | 7/1997 | Kikinis | ..................... 345/212 |
| 5,838,983 | A | * | 11/1998 | Atkinson | ..................... 713/322 |
| 6,088,809 | A | * | 7/2000 | Atkinson | ..................... 713/324 |
| 6,378,077 | B1 | * | 4/2002 | Atkinson | ..................... 713/324 |
| 6,385,734 | B1 | * | 5/2002 | Atkinson | ..................... 713/324 |

* cited by examiner

Primary Examiner—Larry D. Donaghue

(57) ABSTRACT

A system and method to reduce power consumption in a portable computer system while allowing the CDROM drive to continue playing audio CDs. When the system enters a suspend mode, the status of the CDROM drive is checked, and if it is playing an audio CD, it remains powered, otherwise power to the CDROM drive, is also suspended. The system recognizes when the audio CD is finished playing and then places the CDROM drive into the suspend mode.

18 Claims, 1 Drawing Sheet

PORTABLE COMPUTER WITH LOW-POWER AUDIO CD-PLAYER

CROSS-REFERENCE TO RELATED APPLICATION

This application is a continuation of Ser. No. 09/801,386, filed Mar. 8, 2001, which is a continuation of 09/566,748, filed May 9, 2000 (now U.S. Pat. No. 6,378,077, issued Apr. 23, 2002), which is a continuation of 09/150,530, filed Sept. 10, 1998 (now U.S. Pat. No. 6,088,809, issued Jul. 11, 2000), which is a continuation of 08/699,989, filed Aug. 20, 1996 (now U.S. Pat. No. 5,838,983, issued Nov. 17, 1998) and also claims priority from provisional 60/019,109, filed Jun 3, 1996, all of which are hereby incorporated by reference. However, the content of the present application is not necessarily identical to that of the priority application.

BACKGROUND AND SUMMARY OF THE INVENTION

Multimedia PCs often incorporate CD-ROM drives and audio subsections. CD-ROM players are valuable as data storage devices, but also may be used to play standard Audio CD disks. However, typical computers today require that the CPU be fully "on" to play an audio CD. As a result, a typical portable computer today can only play CDs for about 2–3 hours.

Operation of the Portable CD-ROM and Audio Subsection Today

Portable computers today are typically organized as a system including a Microprocessor and its support chips, as well as common peripherals (including, e.g., the graphics subsection, PCMCIA controller, hard disk and floppy disk controller, interface port control for printer and serial busses, for example, keyboard controller, etc.) which interface to the CPU. A fixed disk drive and CD-ROM are typically attached on a common bus, such as an IDE or SCSI bus. "ATAPI-compliant" CD-ROMs are capable of either date retrieval, or playing audio disks (so called "Redbook" or "CD-A" disks). The CD-ROM control signals and data come over the common bus, but audio signals are output directly from the CD-ROM on an independent analog output.

A typical example of a computer audio system employs an audio mixer or "SoundBlaster" compatible audio codec. The output of the CD-ROM is a common input to the Audio Mixer. The function of the mixer is to provide volume control of the CD-ROM outputs along with other PC sounds. The output of the mixer goes to a power amplifier, which outputs to speakers or to a headphone jack. The audio codec and power amplifier together form the Audio section of the computer.

A Real Time Clock (RTC) is a virtually universal peripheral to today's PCs. The RTC is always powered up, and is used to both keep track of the time and date and to act as an "alarm clock" to the system, whereby the system may be "woken" from Suspend after a predetermined time has passed.

Power management circuitry is an integral part of a typical battery-powered computer. Power management is principally controlled by a program in the CPU memory and enables active status to the peripherals and support logic of the system.

Typically, a low-power "Suspend" mode is supported, where the entire state of the system is frozen, timing clocks are turned off, and power is removed from any logic whose state is unimportant. Power to at least some portions of the system must remain active during Suspend. The function of Suspend mode is to freeze the condition of the system while taking the least amount of power. In Suspend, the only activity the system supports is to recognize a "wakeup" event and return to normal operation: the "RESUME" sequence may be initiated by the system (e.g. by button press, modem ring, Real time clock alarm, or low battery event).

Typical power dissipation for the unit in a FULL SUSPEND mode is about 200 milliwatts. After "Resume" from Suspend, power to all devices is returned, and the pre-existing states of the CPU, the operating system, and the application is restored to its state before Suspend was executed.

Suspend mode is usually entered after a period of inactivity, after a critical condition event (for instance, a low battery condition or overtemperature of the unit), or manually by the user.

Typically, when in Suspend mode, power to the fixed disk and CD-ROM drives are disconnected (shown here as SWI under the control of a SUSPEND status signal). The audio subsection is also placed into a non-functional mode; either power may be removed completely from the system or the Audio mixer/Codec and power amplifier may be placed into a non-functional SUSPEND mode under the control of the SUSPEND status line.

The peripheral components are also placed into inactive functionality or turned off by the single SUSPEND status.

Applications run within the CPU to play an audio CD. For example, within the Windows operating system, these utilities are called "Media Player" or "CD player," though many such applications are known.

Limitation of Known Implementations

For the sole purpose of playing an Audio CD, today's portable computer uses more power than is required. This is because, in order to play an Audio Compact Disk today, the entire peripheral set remains powered and functional, although they are not being used. Since a full SUSPEND globally powers down all peripherals, it is not possible on today's portable computers to allow the system to suspend all unnecessary system elements while playing an audio CD.

Innovative System and Method for Low-Power CD Audio

The present application describes a computer system and method which provides a "CD-player Suspend" mode, where the audio section and CD-ROM are left active while the remaining system is placed into a low power mode.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
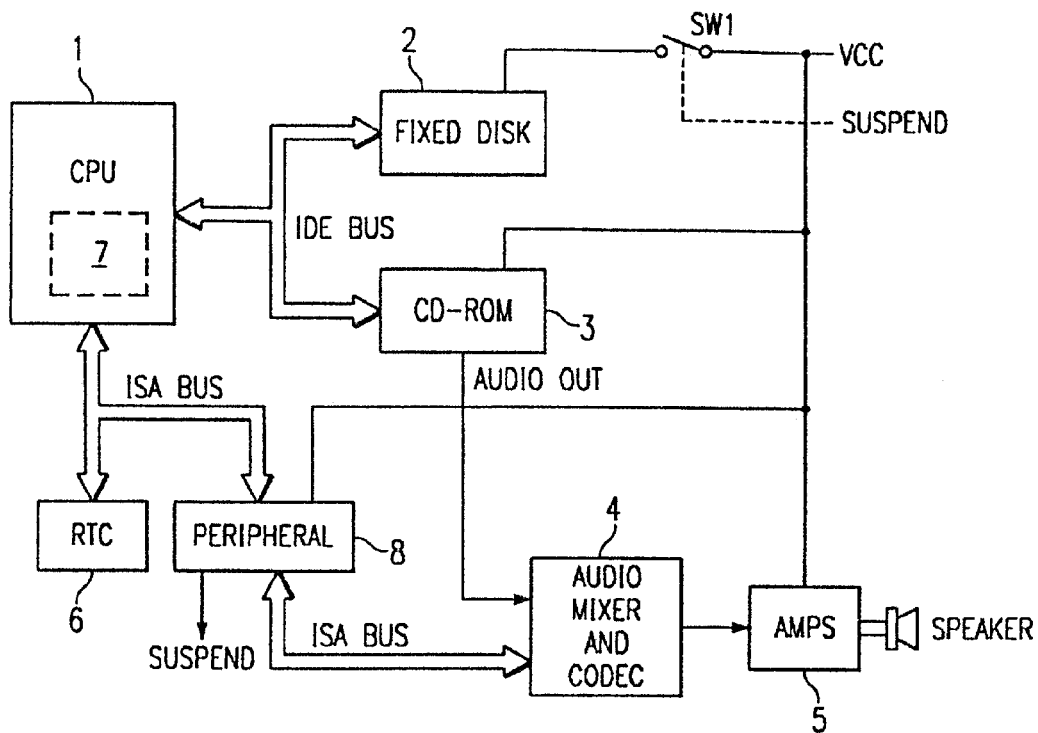
FIG. 1 shows a typical prior art computer system capable of entering a suspend mode.

The numerous innovative teachings of the present application will be described with particular reference to the presently preferred embodiment (by way of example, and not of limitation), in which: Portable computers today are typically organized as shown in FIG. 1:

The "System" consists of a CPU 1; here, the CPU refers to the Microprocessor and support chips themselves. The common peripherals 8 (including, e.g., the graphics subsection, PCMCIA controller, hard disk and floppy disk controller, interface port control (printer and serial busses), keyboard controller, etc.) interface to the CPU.

A fixed disk drive 2 and CD-ROM 3 are typically attached on a common bus, in this case an IDE or SCSI bus. "ATAPI-compliant" CD-ROMs are capable of either data retrieval, or playing audio disks (so called "Redbook" or "CD-A" disks). The CD-ROM control signals and data come over the IDE bus, but audio signals are output directly from the CD-ROM on an independent analog output.

A typical example of a computer audio system employs an audio mixer or "SoundBlaster" compatible audio codec 4. The output of the CD-ROM is a common input to the Audio Mixer. The function of the mixer is to provide volume control of the CD-ROM outputs along with other PC sounds. The output of the mixer goes to a power amplifier 5. Final output of the power amp is to speakers or to a headphone jack. The audio codec and power amplifier together comprise the Audio section of the computer.

A Real Time Clock (RTC) 6 is a universal peripheral to the PC. The RTC is always powered up, and is used to both keep track of the time and date and to act as an "alarm clock" to the system, whereby the system will be "woken" from Suspend after a predetermined time has passed.

Power management circuitry 7 is an integral part of the battery-powered computer. Power management is principally controlled by a program in the CPU memory and enables active status to the peripherals and support logic of the System.

This application describes a method and system for enabling a low power Audio CD player mode, where the CPU is put into Suspend and the Audio CD is allowed to play. Without this mode, a typical portable computer could only play CDs for about 2–3 hours; with this mode, performance of 10–15 hours on a battery charge is possible. The convenience is for mobile users who want to enjoy the performance of a standalone "Diskman" but don't want the carry weight and size of a separate player.

The basic operation for the presently preferred embodiment is to interrogate the status of the CD-ROM when a Suspend is initiated, and decide which of two low power states to configure the CD-ROM drive and the audio subsection to. The preferred embodiments include a system and method to separate "global" Suspend (whereby all peripherals are turned off) from the "CD-player" Suspend.

Figure 2:
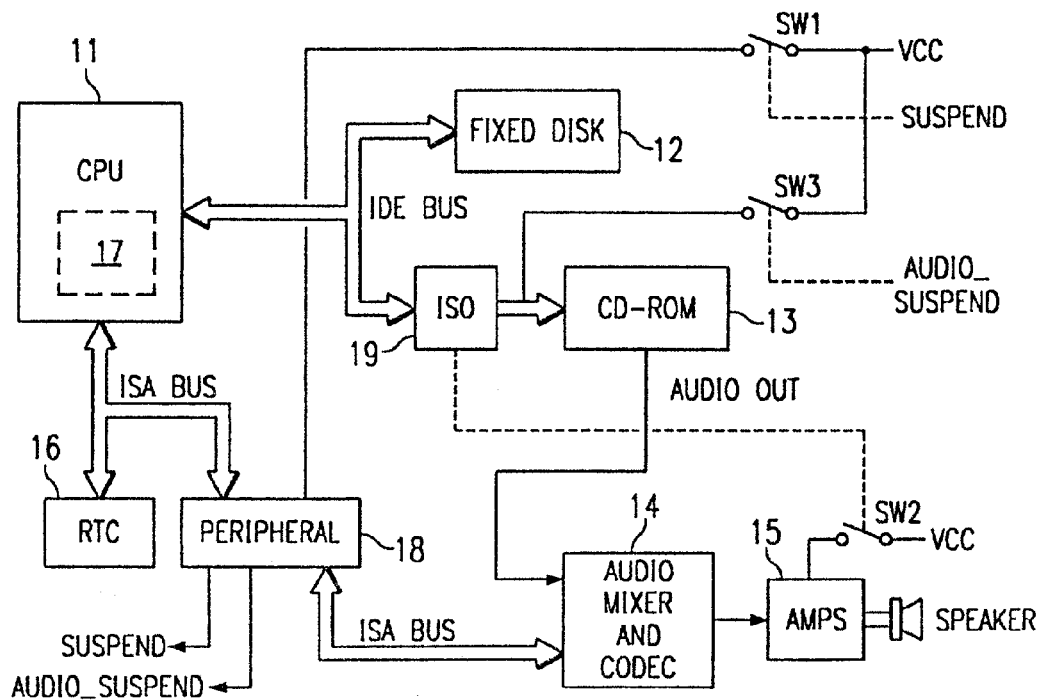
FIG. 2 is a computer system constructed according to the preferred embodiment of the present invention.

A. The hardware required for the presently preferred embodiment is not altogether unique but requires a certain minimum of functionality;
  i. As with the traditional portable, the processor and peripheral set (graphics subsystem, processor and supporting chipset, keyboard controller, peripheral controller, etc) can be placed into a low-power SUSPEND mode.
  ii. One important feature of the preferred embodiment is the ability to leave the Audio mixer portion of the Codec and the power amplifiers in an active state independent of the state of the peripherals or processor. In this state the output of the CD-ROM audio channel may be output through the codec and amplifiers.
  iii. Another important feature of this embodiment is the ability to leave the CD-ROM active when playing an audio CD, independent of the Suspend status of the peripherals and processor.
  iv. Another feature of this embodiment is the ability to remove power from the Fixed disk while leaving power to the CD-ROM (allowing the CD-ROM to remain active). There are several standard ways (and one unique way) to accomplish this. In one alternative, the Fixed disk drive may be placed into a low power Suspend condition independent of the CD-ROM.
  v. Optionally, a signalling method for Audio CD commands (for example, fast forward, seek, skip) from the keyboard or control panel may become active when the unit is in a "CD Player Suspend" mode.
B. Logic is called during the system entrance into Suspend. The purpose of this logic is to;
  i. Interrogate the system to find if an audio CD is playing in the CD-ROM drive. This interrogation may be manual or automatic.
  ii. As with traditional portables, configure the processor and all peripherals to lowest power mode ("Full Suspend") if no audio disk is playing in the CD-ROM.
  iii. (Unique to this invention) to configure the processor and peripherals to lowest power mode while allowing the CD-ROM drive and Audio subsection to remain active if an Audio CD disk is playing.
C. One feature of the preferred embodiment is a method to exit the low power "CD-player Suspend" once the audio CD is finished playing and configure the machine to an Active state, to a "Full Suspend" state, or to an "Off" state.
A. Specific Hardware Implementation FIG. 2 shows a specific Hardware implementation of the low power CD player.

11. Section 11 comprises the CPU and its support chips. In this instance, the processor is a Pentium CPU and the support chips are the Opti 558 family (556, 557, 558, and 602 devices). A general purpose output of the 602 chip is set high by the CPU when a SUSPEND operation is to occur. Another general purpose output controls the new function, AUDIO_SUSPEND. Both outputs are under control of the CPU via writes to I/O register locations across the ISA bus.
12. The Fixed Disk drive 12 is connected to the IDE bus. The power to the fixed disk drive is enabled through a transistor which is turned OFF when Suspend is active. This switch is represented at SW1.
13. The CD-ROM 13 has separate power control, enabled through SW3. SW3 is a transistor which is turned off when the signal AUDIO_SUSPEND from section 11 is active.
14. The audio mixer and codec functions are performed with an ESS1688 device 14. The ESS1688 is a single-chip SoundBlaster-compatible device which interfaces to the CPU across an ISA bus. The ESS1688 device may be placed into "partial standby," where the digital section (the Codec function of the ESS) is placed into suspend but the analog mixer section remains active. This enables the ESS device to continue to function as a volume control when the System is in CD-player Suspend mode. The ESS1688 device is placed into a partial standby mode by writes across the ISA bus to registers inside the device. Power is applied to the ESS1688 device during both SUSPEND or CD-Player Suspend modes. The specification for the ESS1688 may be obtained from ESS Technology, Inc., 48107 Landing Parkway, Fremont, Calif. 94538-6407, U.S.A., and is hereby incorporated by reference.

15. Power to the audio amplifiers 15 is enabled through a transistor gated by AUDIO_SUSPEND.
16. The Real Time Clock 16 (RTC) function is performed by the 602 chip. The RTC functions are always active. In this specific implementation, the RTC is used to terminate the CD-player mode by waking the system after the audio CD will have finished playing.
17. Power management circuitry 17 is an integral part of the battery-powered computer. Power management is principally controlled by a program in the CPU memory and enables active status to the peripherals and support logic of the System.
18. The peripheral chips 18 (the graphics controller, fixed disk drive logic, parallel and serial port controls, etc) is powered off by disabling a transistor connected to VCC. (In usual practice, the register contents of these peripherals will be read and stored into non-volatile memory under control by the CPU before power is removed). The transistor is turned off when the signal SUSPEND is active.
19. Because the CD-ROM drive 13 shares the IDE bus with the Fixed disk drive 12, and power is removed from the Fixed disk drive, the control lines attached to the IDE device will go low. Since the CD-ROM control lines are active low, this would force the CD-ROM into an active state and upset the state of the CD-ROM. To avoid this, the control lines to the CD-ROM must be forced into a non-active state. In the preferred embodiment, this function is performed by isolating the control lines to the CD-ROM with a tristatable buffer 19 gated by AUDIO_SUSPEND. The lines which are tristated include the RESET*, WRITE*, and READ*. The CD-ROM control lines are held inactive through the use of pullup resistors added between the CD-ROM inputs and VCC.

B. A Method to Enter and Exit CD-Player Mode

This process is performed when a SUSPEND is requested. According to the preferred method; the system interrogates whether the CD-ROM is playing an Audio-CD and determines the appropriate power state of the system. The system then enables a mechanism for terminating the CD-Player suspend mode and returns the system to a Full Suspend mode. As is usual for any SUSPEND function, the software for performing these functions is stored in BIOS ROM accessible by the CPU.

1. Interrogating the CD-ROM

Characteristic of an ATAPI compliant CD-ROM is the command "Play Audio CD." This command will be issued by an application, for example the "Media Player" application under the Windows operating system. After this command is issued, the CD-ROM will play without any further instruction by the CPU.

In the preferred embodiment, the system determines if the CD-ROM is playing an Audio CD through an ATAPI query to the CD-ROM drive. Available, standard ATAPI commands include the REQUEST SENSE, INQUIRE, and READ CD commands. The CD-ROM will respond with a status byte indicating if an Audio CD is busy playing.

2. No Audio CD is Playing

If no audio CD is playing (an ATAPI query answer replies negatively) then the entire system is placed into Full SUSPEND. The system performs normal SUSPEND function (copies all important register data to non-volatile memory and enables a Resume event) before concluding with the below power sequence;

a. The ESS1688 is put into Full Suspend. Full suspend is entered by setting bit 3 of the Power management register (register 227h) to a "0" ("ANA-LOG stays off"); then by pulsing bit 2 high, then low.
 b. Power to the CD-ROM and to the power Amplifiers is turned off by setting the line AUDIO_SUSPEND active.
 C. Power is removed from the remaining chipset (and main functional clocks are terminated) by setting the SUSPEND line active.

3. An Audio CD is Playing

If an Audio CD is playing (ATAPI query returns "Playing Audio CD" status) then the CD-ROM drive and Audio are left active while the rest of the system is placed into Suspend.

After copying the state of the peripheral set registers to non-volatile memory (the normal operation before executing a full Suspend) the system performs the following timing sequence;

a. The ESS1688 is placed into "partial suspend." Partial suspend is entered by setting bit 3 of the Power control register to a "1," then by pulsing bit 2 high, then low.
 b. Power to the CD-ROM is left to the CD-ROM, and to the power amplifiers by leaving the signal "CD-player Suspend" line inactive.
 c. A mechanism is employed to terminate the CD-player mode and return to the Full Suspend mode when the CD is through playing. This mechanism uses the RTC device to periodically wake the System from "CD-player Suspend" to "Full awake" condition. This is accomplished by;
  i. the RTC has an alarm feature. When the actual time matches a preset time, an "alarm" is issued. The alarm is activated by reading the present time, adding a certain amount to the time, then writing to the Alarm register inside the RTC. In this example, 15 minutes is added to the actual time to create the Alarm time (the alarm will ring 15 minutes later). The alarm registers are indexes 01h, 03h, and 05h inside the RTC I/O location of 70h and 71h.
  ii. The alarm is enabled to wakeup the System by setting the IRQ *in this case, ISA IRQ8 from the RTC) to generate a "RESUME" event. This is done by writing to the register SYSCFG 6Ah, bit 6 inside the 602 chip.
 d. The system enters an otherwise "full" suspend by setting the Suspend line active. The CPU (1), peripheral set (8), and hard drive (2) will become inactive and the isolation to the CD-ROM (9) will become active. The state of the CD-ROM is thus preserved, and the power amplifiers will continue to operate in the "CD-Player" suspend mode.
 e. A mechanism checks to see if the Audio CD is finished playing. 15 minutes after the System enters CD-player suspend mode, the RTC will issue an IRQ and the system will RESUME. Normally upon a resume, a full restoration is made to the system and the peripheral set. For the preferred embodiment, a limited RESUME occurs, where the only task for the processor is to query the CD-ROM for playing status and the system repeats the entire process (at 1 above) If the CD-ROM has stopped playing the audio CD, a query to the CD-drive will return the status "Audio disk stopped." In that case (no audio CD is playing) the system will enter at "2" and issue a full Suspend. If the Audio CD is playing, the system continues at "3" and the Audio CD continues playing.

According to one disclosed embodiment, there is provided a method for operating a portable computer system, comprising the steps of: receiving a command to place said system in a suspend mode; determining whether an audio CD is playing in a CDROM drive; if an audio CD is not playing, placing said system in a suspend mode; if an audio CD is playing, continuing to operate said CDROM drive, while placing the remainder of said system in a suspend mode.

According to another disclosed embodiment, there is provided a method for operating a portable computer system, comprising the steps of: receiving a command to place said system in a suspend mode; determining whether an audio CD is playing in a CDROM drive; if an audio CD is playing, then leaving said CDROM drive in its present state; isolating at least one of a plurality of CDROM control signals from other system signals; placing a digital section of an audio CODEC in a suspend mode; leaving an analog section of said audio CODEC in an active mode; and leaving at least one audio power amplifier in an active state; if an audio CD is not playing, then placing said CDROM drive in a suspend mode; placing said audio and digital sections of said CODEC in a suspend mode; placing said audio power amplifier in a suspend mode.

According to another disclosed embodiment, there is provided a portable computer system comprising: a microprocessor; a memory connected to said microprocessor; a display device connected to display data generated by said microprocessor; an audio controller connected to said microprocessor; an audio input device connected to said audio controller for reading audio data; a battery connected to power said microprocessor, memory, display device, audio controller, and audio input device; wherein said system may be placed in a suspend mode in which said microprocessor and display are placed reduced power state; and wherein said audio input device and said audio controller may be selectably placed in a reduced power state when said system is in said suspend mode.

FURTHER MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

Variations of the CD-ROM Isolation Logic 9

The preferred approach isolates the CD-ROM from the IDE bus when the low power CD-Player suspend mode is enabled. There are other methods for accomplishing this;

1. No isolation is used between the Fixed disk drive and the CD-ROM. There are 2 variations of this method;
    a. The hard drive and CD-rom drive may be powered at the same time; no effort is made to isolate the CD-rom power from the hard drive power. The fixed disk may be placed in to a SUSPEND mode by writing to a control register in the Fixed disk itself. Because the Fixed Disk drive is powered up in this mode, it will not activate the (active low) control signals on its attached IDE bus as it would if powered off. This is not the preferred approach, since today the fixed disk drive consumes about half a watt when in SUSPEND (about 20% of the CD-Player suspend power budget).
    b. The hard drive logic may be "input tolerant" so that when the hard drive is unpowered, there is no conduction between the IDE bus and the hard drive. No such drives exist today.
2. Isolation may be used on the hard drive; instead of decoupling the IDE bus from the CD-rom drive during CD-Player mode, the hard drive may be decoupled and powered off. This requires the IDE interface logic to maintain an inactive state during the CD-Player Suspend.
3. Isolation may consist of a latch instead of a tristatable buffer (section 9) since the purpose of the isolation is simply to maintain the present state of the CD-ROM.
4. The CD-ROM may remain powered during either Full SUSPEND or CD-PLAYER SUSPEND, but have the CD-ROM enter a low-power Suspend condition instead of being powered off when no audio CD is playing.

Variations in the Audio Mixer

The audio mixer could be bypassed completely in CD-Player mode. Volume control could be done by other passive or active circuitry. In the preferred approach, volume control is performed simply with a potentiometer located between the Audio Mixer and the power amplifier.

Variations in Termination of CD-Player mode

The preferred approach uses the RTC to wakeup the system periodically and re-evaluate the status of the CD-ROM. Other approaches may be used;

1. The RTC may be set for a single maximum time before the CD-Player mode is exited. The time may be the maximum possible length of an audio CD (74 minutes) or the system may determine the playing time remaining on the present CD and set the RTC alarm for that length of time.
2. The System could wake up upon an opening of the CD-drive tray. This would be more convenient to a user who wants to start playing another disk, since the application to initiate playing of the next CD would be available through the operating system. One possible implementation for this is to have the IRQ on the IDE bus wake the system from CD-PLAYER SUSPEND to Fully active, where the application which initiates the CD-player function could restart.
3. The CD-Rom drive could accept commands from another control source when in CD-Player suspend for common Disk player commands such as track skip, fast forward reverse, etc. In this variation, control buttons which are read by the System during Fully On operation but are read by the CD-ROM when in CD-Player mode. A possible implementation for this is;
    1. On the system enclosure are dedicated lines for the CD-rom commands. During normal (fully ON) operation, these lines are read by the keyboard controller and instruct an audio disk player application running under the operating system. The Application itself instructs the CD_ROM to change tracks, etc by issuing ATAPI packet commands to the CD-ROM.
    2. During CD-Player mode, the buttons are read directly by the CD-ROM with no required intervention by the CPU. A possible implementation of this is to change the function of the IDE bus to signal the CD-ROM drive that the CD-Player mode is engaged, and to signal directly to the CD-ROM (not through the packet ATAPI commands) entrance to CD-player mode, the CD is alerted to use the alternative control lines instead of ATAPI commands.

Variation on the Method

The preferred approach interrogates the ATAPI CD-ROM by query commands to detect the playing status of the CD. Other methods exist to determine if a CD is playing an Audio Disk;

1. Another method for determining if an audio CD is playing is for the application which initiates the CD-rom playing the Audio disk to "register" with the system when a play is initiated. Instead of the system reading the state of the CD-ROM drive, it can instead read simply a memory bit which is set by the application itself.
2. The system can monitor the audio output stream of the audio mixer to determine if a CD-ROM is active. In this implementation, the system would measure the analog output of the CD-ROM to determine the status of the CD-ROM drive. The system could also use this to detect when an Audio CD is finished playing and terminate the CD-Player mode.
3. An activity line from the CD-ROM itself could indicate that the CD-ROM is busy playing an audio CD. A possible implementation is for the Audio CD-rom to hold its DASP* line, Interrupt line, or Activity LED active during Audio CD play. The DASP* line is commonly used to indicate data read activity from a CD-ROM drive, but usually does not become active today during play of an Audio CD. So such an implementation would require an enhancement of the current ATAPI CD-ROM drive.

It should also be noted that the disclosed innovative ideas are not limited only to Windows, DOS or UNIX systems, but can also be implemented in other operating systems.

It should also be noted that the disclosed innovative ideas are not limited only to systems using ISA, EISA, and/or PCI busses, but can also be implemented in systems using other bus architectures.

It should also be noted that the disclosed innovative ideas are not limited only to systems based on an x86-compatible microprocessor, but can also be implemented in systems using 680'0, RISC, or other processor architectures.

It should also be noted that the disclosed innovative ideas are not by any means limited to systems using a single-processor CPU, but can also be implemented in computers using multiprocessor architectures.

What is claimed is:

1. An apparatus, comprising:
   isolation logic configured to isolate a computer system from a CD-ROM drive; and
   control logic configured to couple to the CD-ROM drive, the control logic capable of placing the CD-ROM drive into a plurality of power states;
   wherein the control logic places the CD-ROM drive into a full-power state to thereby cause the isolation logic to isolate the computer system from the CD-ROM drive, and cause the CD-ROM drive to be operational for playing an audio CD while the computer is in a reduced-power state.

2. The apparatus of claim 1, wherein the reduced-power state comprises an off state.

3. The apparatus of claim 1, wherein the control logic enables the CD-ROM drive to receive user inputs from control buttons while the computer is in the reduced-power state.

4. The apparatus of claim 1, wherein the control logic is further configured to couple to an audio amplifier that is coupled to the CD-ROM drive, and wherein the control logic is configured to place the audio amplifier into the same power state as the CD-ROM drive.

5. The apparatus of claim 4, wherein the CD-ROM drive accepts the audio CD, and audio extracted from the audio CD is provided to the audio amplifier while the computer is in the reduced-power state.

6. The apparatus of claim 5, wherein the control logic places the audio amplifier into the reduced-power state when the CD-ROM drive is no longer playing the audio CD.

7. The apparatus of claim 1, wherein the control logic places the CD-ROM drive into the reduced-power state when the CD-ROM drive is no longer playing the audio CD.

8. An apparatus, comprising:
   control logic configured to couple to a CD-ROM drive and a computer, and further configured to select a control source that receives user input;
   wherein the user input causes the control logic to set the CD-ROM drive to a full-power mode if the computer is not in the full-power mode; and
   wherein the CD-ROM drive plays an audio CD in response to the user input while the computer is not in the full-power mode.

9. The apparatus of claim 8, wherein control buttons are selected as the control source if the computer is not in the full-power mode.

10. The apparatus of claim 8, wherein an audio disk player application program executing on the computer is selected as the control source if the computer is in a full-power mode.

11. The apparatus of claim 8, wherein the control logic sets the CD-ROM drive to a reduced-power mode when the CD-ROM drive has stopped playing the audio CD.

12. The apparatus of claim 11, wherein the reduced-power mode comprises turning off the CD-ROM drive.

13. The apparatus of claim 8, wherein the control logic is further configured to couple to an audio amplifier coupled to the CD-ROM drive and to set the audio amplifier to the same power mode as the CD-ROM drive.

14. The apparatus of claim 13, wherein audio information read from the played audio CD is provided to the audio amplifier while the computer is not in the full-power mode.

15. The apparatus of claim 14, wherein the control logic sets the CD-ROM drive to a reduced-power mode when the CD-ROM drive has stopped playing the audio CD.

16. The apparatus of claim 15, wherein the reduced-power mode comprises turning off the CD-ROM drive.

17. The apparatus of claim 14, wherein the control logic sets the audio amplifier to a reduced-power mode when the CD-ROM drive has stopped playing the audio CD.

18. The apparatus of claim 17, wherein the reduced-power mode comprises turning off the audio amplifier.

* * * * *

UNITED STATES PATENT AND TRADEMARK OFFICE
CERTIFICATE OF CORRECTION

| | | |
|---|---|---|
| PATENT NO. | : 7,055,049 B2 | Page 1 of 1 |
| APPLICATION NO. | : 10/134937 | |
| DATED | : May 30, 2006 | |
| INVENTOR(S) | : Lee Atkinson | |

It is certified that error appears in the above-identified patent and that said Letters Patent is hereby corrected as shown below:

In column 2, line 22, delete "SWI" and insert -- SW1 --, therefor.

In column 9, line 46, delete "680'0" and insert -- 680x0 --, therefor.

Signed and Sealed this

Seventeenth Day of March, 2009

JOHN DOLL
*Acting Director of the United States Patent and Trademark Office*